United States Patent

Singh et al.

[11] Patent Number: 5,819,113
[45] Date of Patent: Oct. 6, 1998

[54] METHOD OF IDENTIFYING END OF POCKET BY WRITING THE ADDRESS OF LAST DATA INTO THE FIRST LOCATION OF THE MEMORY

[75] Inventors: Alok Singh, Fremont; Rajat Roy, Sunnyvale, both of Calif.

[73] Assignee: Advanced Micro Devices, Inc., Sunnyvale, Calif.

[21] Appl. No.: 659,795

[22] Filed: Jun. 6, 1996

[51] Int. Cl.[6] .............................. G06F 13/00; H04L 12/00
[52] U.S. Cl. .............. 395/875; 395/200.61; 395/200.75; 395/854; 370/475
[58] Field of Search ............................... 395/872, 200.61, 395/200.75, 854, 875; 370/412, 475

[56] References Cited

U.S. PATENT DOCUMENTS

| | | | |
|---|---|---|---|
| 4,885,744 | 12/1989 | Lespagnol et al. | 370/466 |
| 4,914,652 | 4/1990 | Nguyen | 370/452 |
| 4,922,438 | 5/1990 | Ballweg | 370/465 |
| 4,949,301 | 8/1990 | Joshi et al. | 711/100 |
| 5,097,261 | 3/1992 | Langdon, Jr. et al. | 341/51 |
| 5,133,062 | 7/1992 | Joshi et al. | 395/500 |
| 5,524,007 | 6/1996 | White et al. | 370/419 |
| 5,528,587 | 6/1996 | Galand et al. | 370/412 |

FOREIGN PATENT DOCUMENTS 0 429 054 A   5/1991   European Pat. Off. ........ H04L 29/06

OTHER PUBLICATIONS

Data Structures and Algorithms, Jun. 1993, USA pp. 392–397 XP002036299, AHO A V et al. see p. 393, line 14–p.395, line 9, figure 12.11.

Patent Abstracts of Japan vol. 012, No. 079 (P–676), 12 Mar. 1988 & JP 62 216046 a (Fujitsu Ltd), 22 Sep. 1987, see abstract.

Patent Abstracts of Japan vol. 009, No. 013 (P–328). 19 Jan. 1985 & JHP 59 160231 A (Canon KK), 10 Sep. 1984, see abstract.

Patent Abstracts of Japan vol. 007, No. 067 (p–184), 19 Mar. 1983 & JP 57 210498 A (Fujitsu KK), 24 Dec. 1982, see abstract.

*Primary Examiner*—Thomas C. Lee
*Assistant Examiner*—Ki S. Kim
*Attorney, Agent, or Firm*—H. Donald Nelson

[57] ABSTRACT

A method of precisely identifying the end of packet location in a memory device. A first and second memory location in the memory device are reserved and a sequence of data is written into the memory device in sequential memory locations. When the last of the sequence of data is written into memory the memory location is written into the first reserved memory location. The second memory location is written to show that the end of packet has been written into memory.

12 Claims, 7 Drawing Sheets

METHOD OF IDENTIFYING END OF POCKET BY WRITING THE ADDRESS OF LAST DATA INTO THE FIRST LOCATION OF THE MEMORY

BACKGROUND OF THE INVENTION

1. Field of the Invention

This invention relates generally to a method and device for controlling the transmission of information by a station to and from an ethernet and, more particularly, to a method and device for increasing the performance of the transmission of information, and even more particularly, to a method and device for efficiently storing multiple packets of information in a memory device by identifying precisely the location of the end-of-packet in the memory device.

2. Discussion of the Related Art

This application is related to U.S. patent application, Ser. No. 08/659,733 entitled "DATA STRUCTURE TO SUPPORT MULTIPLE TRANSMIT PACKETS FOR HIGH PERFORMANCE" invented by Rajat Roy, Jeffrey Dwork and Jenny Fischer currently pending and U.S. patent application, Ser. No. 08/669,728, entitled "ADDRESS GENERATION AND DATA PATH ARBITRATION TO AND FROM SRAM TO ACCOMMODATE MULTIPLE TRANSMITTED PACKETS" invented by Alok Singh, Rajat Roy, and Jerry Kuo currently pending, both applications assigned to the assignee of this application and both filed on the same date as this application.

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation.

The ISO Open Systems Interconnection Basic Reference Model defines a seven-layer model for data communications in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables which are typically more expensive than twisted-pair cables. The 10Base-T protocol of IEEE Standard 802.3 prescribes a rate of 10 megabits/second ("Mbps") for transferring data over twisted-pair cables.

Referring to the drawings, FIG. 1 illustrates how a workstation, personal computer, file server, data terminal equipment, or other such information processing equipment, represented by CPU 12, is connected to ethernet 22 or other types of data communications equipment represented by the media independent interface 24. In FIG. 1, ethernet controller 14, also commonly known as a Network Interface Controller is situated between the CPU 12 and the incoming (and outgoing) ethernet 22 lines. Typically, the ethernet 22 consists of two pairs of twisted-pair copper cables, an incoming pair referred to as 10R and an outgoing pair referred to as 10T.

The ethernet controller 14 is responsible for controlling the transmission of outgoing data to the outgoing pair or cable and the reception of incoming data from the incoming pair or cable. For example, before being furnished to the outgoing pair or cable, the outgoing data is Manchester encoded to reduce electromagnetic interference. The Manchester encoding causes some portions of the data stream to be pulses at 10 MHz while other portions of the data stream are pulses at 5 MHz.

The ever growing need to transfer more information faster, accompanied by increases in data processing capability, is necessitating an expansion to data transfer rates considerably higher than the 10 Mbps rate prescribed by the 10Base-T protocol. As a consequence there is a 100Base-TX protocol which extends IEEE Standard 802.3 to accommodate data moving at an effective transfer rate of 100 Mbps through twisted-pair cables of presently existing types. There are situations in which it is desirable that the physical transmission media be capable of handling data transferred through twisted-pair cables at both the 100Base-TX rate and the lower 10Base-T rate.

In addition to the problems associated with the transmission of data at different rates over the ethernet or the media independent interface, there are the problems associated with the varying data handling capabilities of the personal computers, workstations, file servers, repeaters, data terminal equipment, and other such information processing equipment. For example, in a personal computer system there may be other equipment or duties that the CPU 12 must attend to in addition to the receipt or transmission of data over the ethernet.

The ethernet controller 14 (FIG. 1) is responsible for controlling the transmission of data from the CPU 12 to the ethernet 22. One of the major problems confronted by the ethernet controller 14 is to control the transmission of data so there are minimal interruptions in transmission. For example, if there is an interruption in the transmission of data, the ethernet system then must stop and retransmit all of the data. This means that the transmitting station must retransmit the data if the receiving station is interrupted and cannot continue to receive data.

What is needed is an ethernet controller that has the flexibility to better control the transmission of data. The present invention teaches a method of providing a buffer for the temporary storage of incoming or outgoing data which are formatted into packets. For the most efficient storage of information in the form of packets into a buffer, which by necessity is as small as possible for both space reasons and cost reasons, it is desirable to store the packets contiguously, that is, without any unfilled memory locations between packets.

What is needed is a method of detecting the end-of-packet of a sequence of bytes, or other units of data in a packet, and to identify the last memory location into which the sequence was written to allow sequential storage of the next packet so that multiple packets of information can be efficiently stored in a memory device.

SUMMARY OF THE INVENTION

In accordance with the present invention a method of precisely identifying the end-of-packet location in a memory device used as a buffer during the transmission of packets of data from one location to another. A memory device is utilized as a buffer. A first location in the memory device is reserved and a sequence of data is written sequentially into the memory device. When the last byte of a packet is identified, the address of the memory location in which the last byte is written is written to the first reserved location.

The last byte of data in the packet is identified by inputting into a counter the number of bytes that is contained in the packet. The counter is incremented as each byte is written into a memory location. A write pointer is updated with the memory location into which data is being written. The contents of the write pointer is written to the reserved first memory when the counter reaches the inputted number of bytes.

A second memory location in the memory device is reserved immediately following the first reserved memory location and the value HEX0000 is written into the second reserved location. The data is then written into the memory device starting with the first memory location following the second reserved location.

When the write counter reaches the inputted number of bytes the value in the second reserved location is changed from the value HEX0000 to the value HEX1000.

The data is read from the memory device. The value contained in the first reserved memory device is written to a first register and the most significant bit in the second reserved register is written to a second register. The value in the first register is compared to a value in a read pointer and a logic TRUE or a logic FALSE obtained. If the value in the second register is TRUE and the value in the first register is TRUE the end of packet has been detected.

In the event the end of packet has not been written the read pointer is prevented from going past the write pointer by incrementing a value in a third register when a memory location has been written and decrementing the value in the third register when a memory location has been read. When the value in the third register is zero, an EMPTY flag is set and read is inhibited.

The present invention is better understood upon consideration of the detailed description below, in conjunction with the accompanying drawings. As will become readily apparent to those skilled in this art from the following description there is shown and described a preferred embodiment of this invention simply by way of illustration of the mode best suited to carry out the invention. As it will be realized, the invention is capable of other different embodiments, and its several details are capable of modifications in various, obvious aspects all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings.

DETAILED DESCRIPTION

Figure 1:
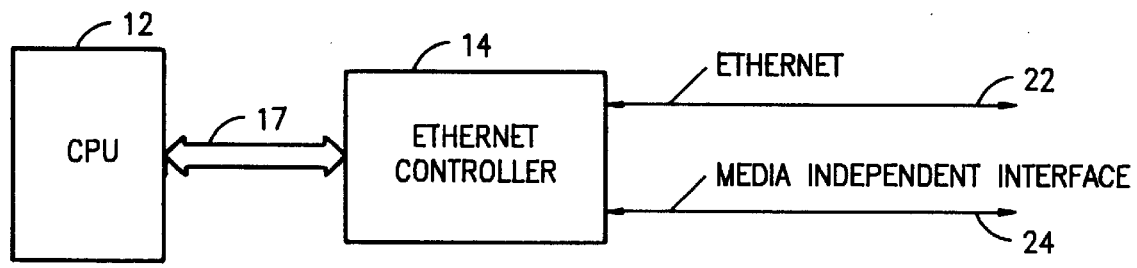
FIG. 1 shows an overall view of a prior art system with an ethernet controller, a CPU, an ethernet connection and a media independent interface connection.

Referring now to FIG. 1 there is shown a prior art system 10 with a CPU 12, and an ethernet controller 14 with connections to an ethernet 22 and a media independent interface 24. The CPU 12 is connected to the ethernet controller by BUS 17.

Figure 2:
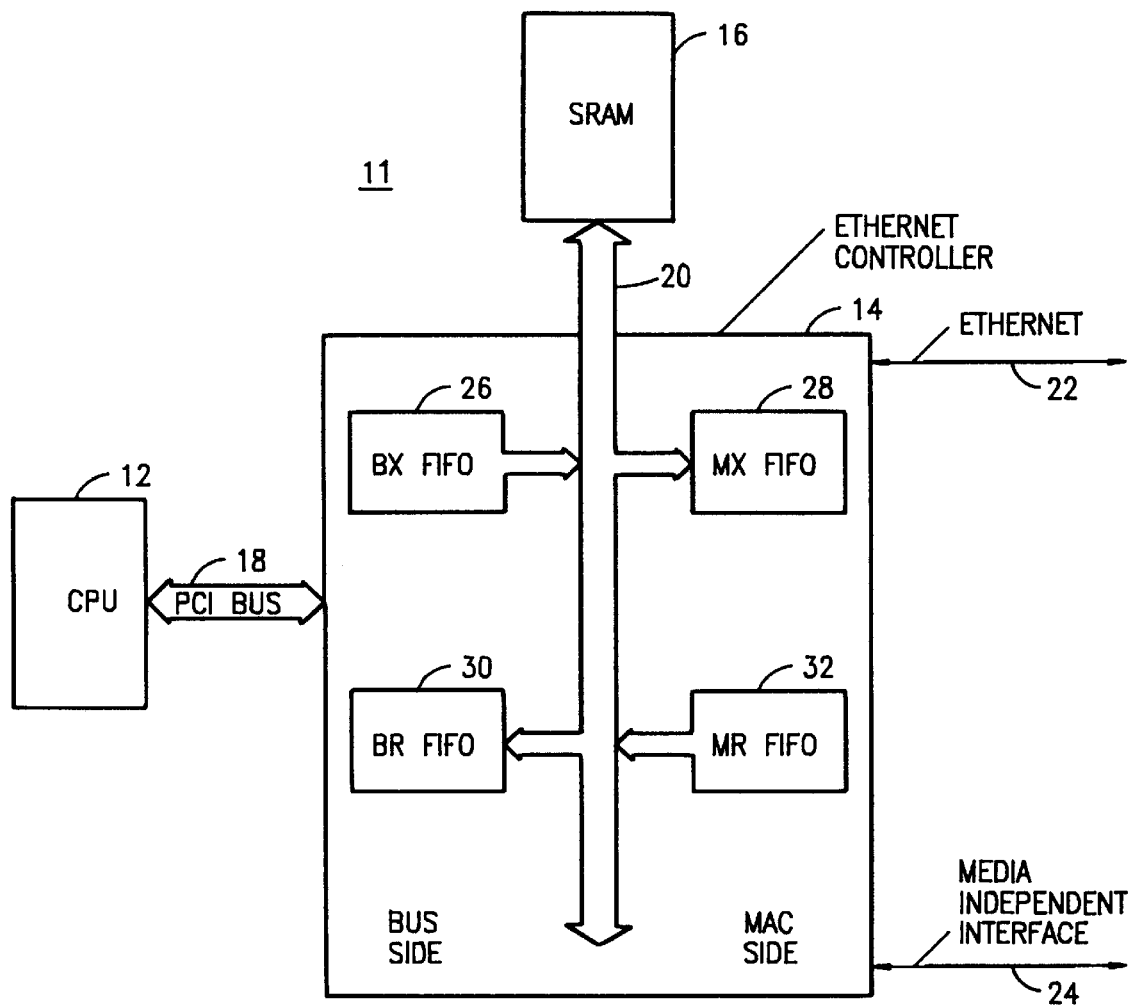
FIG. 2 shows an overall view of a system with present invention.

Referring now to FIG. 2, there is shown a system 11 as taught by the present invention. In this and subsequent figures like numerals will be used to denote like components. A portion of the ethernet controller 14 is shown in FIG. 2. It is to be understood that the ethernet controller 14 has many more functions other than the function as taught by the present invention and only those components that are pertinent to the present invention are discussed. System 11 includes an SRAM 16 connected externally to the ethernet controller 14 and the CPU 12. This construction is to allow the ethernet controller 14 semiconductor device to be as small as possible and to allow the flexibility for the design engineer to provide a larger buffer if necessary. As can be appreciated, the SRAM 16 could be designed as part of the ethernet controller 14 device. In addition, the CPU 12, the ethernet controller 14, and the SRAM 16 could all be designed as a single semiconductor device.

The function of the illustrated portion of the ethernet controller 14 is to manage the transmission of data to and from the ethernet 22 and the media independent interface 24. The ethernet controller 14 manages the transmission of data by utilizing SRAM 16 as a buffer to prevent the slowing down of the transmission of data to and from either the CPU 12 or the ethernet 22 or the media independent interface 24. There are various reasons that the transmission of data can be slowed down, for example, the latency of CPU 12 can be high and the transmission of data from the ethernet 22 could be stopped until CPU 12 is freed from other interrupts. Conversely, the CPU 12 could be attempting to send data via the ethernet 22 and the ethernet 22 could be busy which would cause the data from the CPU 22 to be stopped or held until the ethernet 22 is free.

To avoid problems caused by not being able to complete the sending or the receiving of information, the ethernet controller 14 has four FIFOs, a BX FIFO 26, an MX FIFO 28, a BR FIFO 30, and an MR FIFO 32. The BX FIFO 26 and BR FIFO 30 are on the bus side of ethernet controller 14 and MX FIFO 28 and MR FIFO 32 are on the Media Access Control (MAC) side of the ethernet controller 14. Each of the FIFOs controls either an input or output function. The BX FIFO 26 controls the transmission of data from CPU 12 to SRAM 16. MX FIFO 28 controls the transmission of data from SRAM 16 to the ethernet 22 or the media independent interface 24. Similarly, MR FIFO 32 controls the transmission of data from either the ethernet 22 or the media independent interface 24. In the following discussion, only the transmission of data from the CPU 12 to SRAM 16 will be discussed because other functions are similar. The following discussion includes the writing of data from the CPU 12 to SRAM 16 and the reading of data from SRAM 16.

Figure 3:
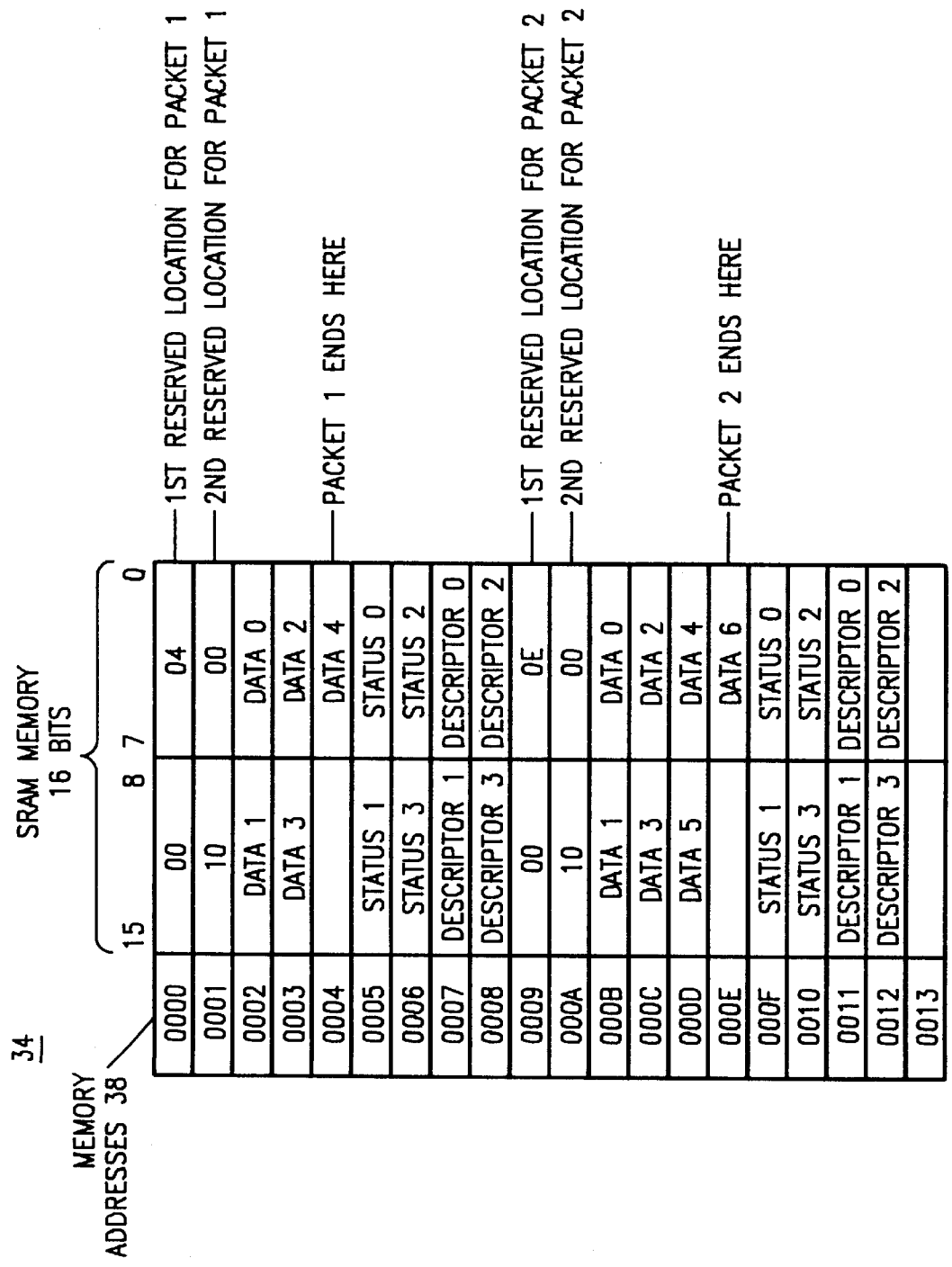
FIG. 3 shows a portion of a memory as used in the present invention.

Referring now to FIG. 3 there is shown a memory portion 34 of a memory device such as SRAM 16. It is to be understood that other memory devices can be used without departing from the intended scope of this invention. Shown are 18 memory locations 36 with memory addresses 38 from HEX0000 to HEX0011. In this discussion, the convention is followed that memory locations are addressed by words, that is, each memory location has two 8 bit bytes, an upper byte location and a lower byte location. It should be understood that the portion 34 could be anywhere in SRAM 16 and that the addresses 38 could be any sequence of values within the maximum size of the memory. Shown in FIG. 3 are two packets of data written into memory portion 34. The first packet is made up of 5 bytes, DATA 0 through DATA 4, and are shown in memory locations with addresses of HEX0002 through HEX0004. Because DATA 4 is the last byte of the first packet, that is, the end-of-packet, the address (HEX0004) of the memory location in which DATA 4 is written is written into a first reserved memory location, in this case, the memory location with an address of HEX0000. Because the last byte in the first packet has been written, the contents of a second reserved memory location, in this case, the memory location with an address of HEX0001 is changed to HEX1000. The value HEX1000 indicates that the packet is valid and will be discussed in more detail below.

In this example, the first two reserved locations in the portion of the memory in which memory is to be written are memory locations HEX0000 and HEX0001. The location of each pair of reserved locations is dependent upon the sizes of the preceding packets stored in the memory. After each end of packet there are two 16 bit memory locations for a 32 bit STATUS and two 16 bit memory locations for a 32 bit DESCRIPTOR. In FIG. 3 these are memory locations HEX0005 and HEX0006 for the STATUS and HEX0007 and HEX0008 for the DESCRIPTOR for the first packet. For the second packet, the first reserved location is memory location HEX0009 and the second reserved location is memory location HEX000A. The 32 bit STATUS for the second packet is written into memory locations HEX000F and HEX0010 and the 32 bit DESCRIPTOR for the second packet is written into memory locations HEX0011 and HEX0012. The 32 bit STATUS and DESCRIPTOR for each packet contain information concerning the packet and are not described in detail.

Figure 4:
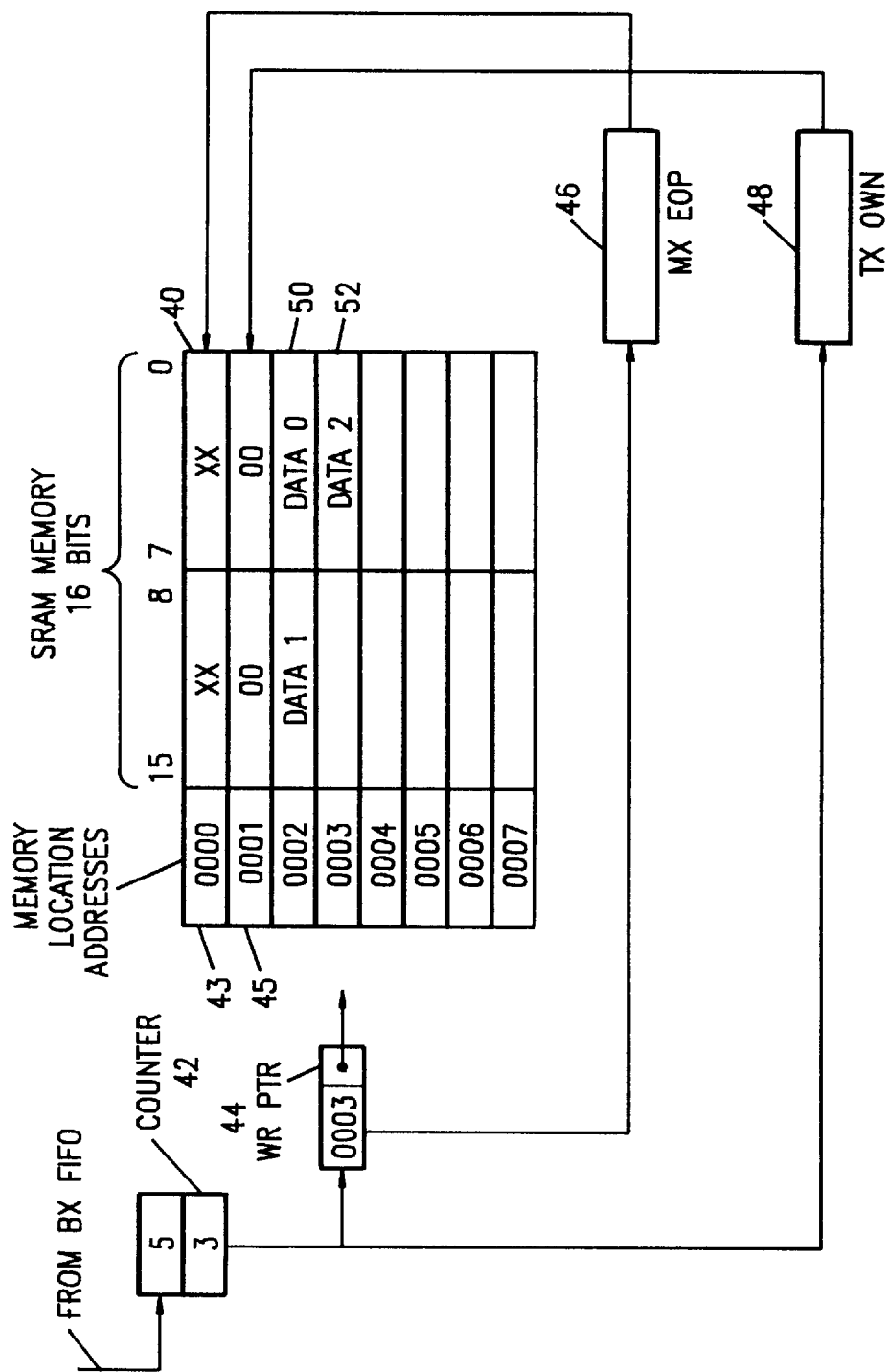
FIG. 4 is an illustration of how data is written into a portion of a memory as taught in the present invention.

Referring now to FIG. 4 there is shown a small number of memory locations 40. The method of writing data to the memory will now be explained. As described above, the explanation will describe the transmission of data from the CPU 12 to either the ethernet 22 or the media independent interface 24. It is to be understood that the following explanation is also applicable to the situation in which data is transmitted from either the ethernet 22 or the media independent interface 24 to the CPU 12. A person of ordinary skill in the art will be able to apply the following explanation to the other portions of the ethernet controller 14 (FIG. 2).

When the CPU 12 wishes to transmit data it will request the applicable bus, in this case the PCI BUS 18, and inform BX FIFO 26 that it has a certain number of bytes of data to transmit. This number is communicated to a counter 42. There is shown the value of 5 written into the counter 42. A five byte packet is being used as an example and will be explained below in conjunction with FIG. 5. The counter 42 is incremented when a memory location is written and when the incremented value is equal to the value input from BX FIFO 26 it indicates that the value just written into memory is the last byte of data in the packet. Alternately, the value representing the number of bytes contained in a packet could be input to counter 42 and counter 42 could be decremented as each byte of data is written and when the value zero is reached it would be indicated that the last byte of data has been written into memory, that is, the end-of-packet has been written.

FIG. 4 illustrates a situation in which the end-of-packet has not been reached. The initial step is to reserve the first two available locations in memory, and for explanation purposes they are shown as memory locations HEX0000 at 43 and HEX0001 at 45. The write pointer WR PTR 44 will initially be pointing to memory location HEX0000 at 43. The contents of memory location HEX0000 43 will be written to a register MX EOP 46 if the value in TX OWN 48 is a zero. The contents of HEX0000 are shown as XXXX which indicates "don't cares" since it doesn't make any difference what value is in HEX0000 until a valid end-of-packet location is written into it. The write pointer WR PTR 44 will be incremented and will point to memory location HEX0001 at 45. The value HEX0000 will be written into the second reserved memory location. HEX0001 at 45. At this point, the WR PTR 44 would read HEX0001, and counter 42 would not have been incremented or decremented because no data has been written. The WR PTR 44 would increment and the first and second bytes of data, DATA 0 and DATA 1, at 50, will be written into memory location HEX0002 and the counter 42 would be incremented to 2. This will repeat until the situation shown in FIG. 4 is reached. The WR PTR 44 is pointing to memory location HEX0003 and DATA 2 at 52 has been written into the lower byte memory location HEX0003 and counter 42 has been incremented to the value 4 indicating that either 3 or 4 bytes of data have been written into memory.

Figure 5:
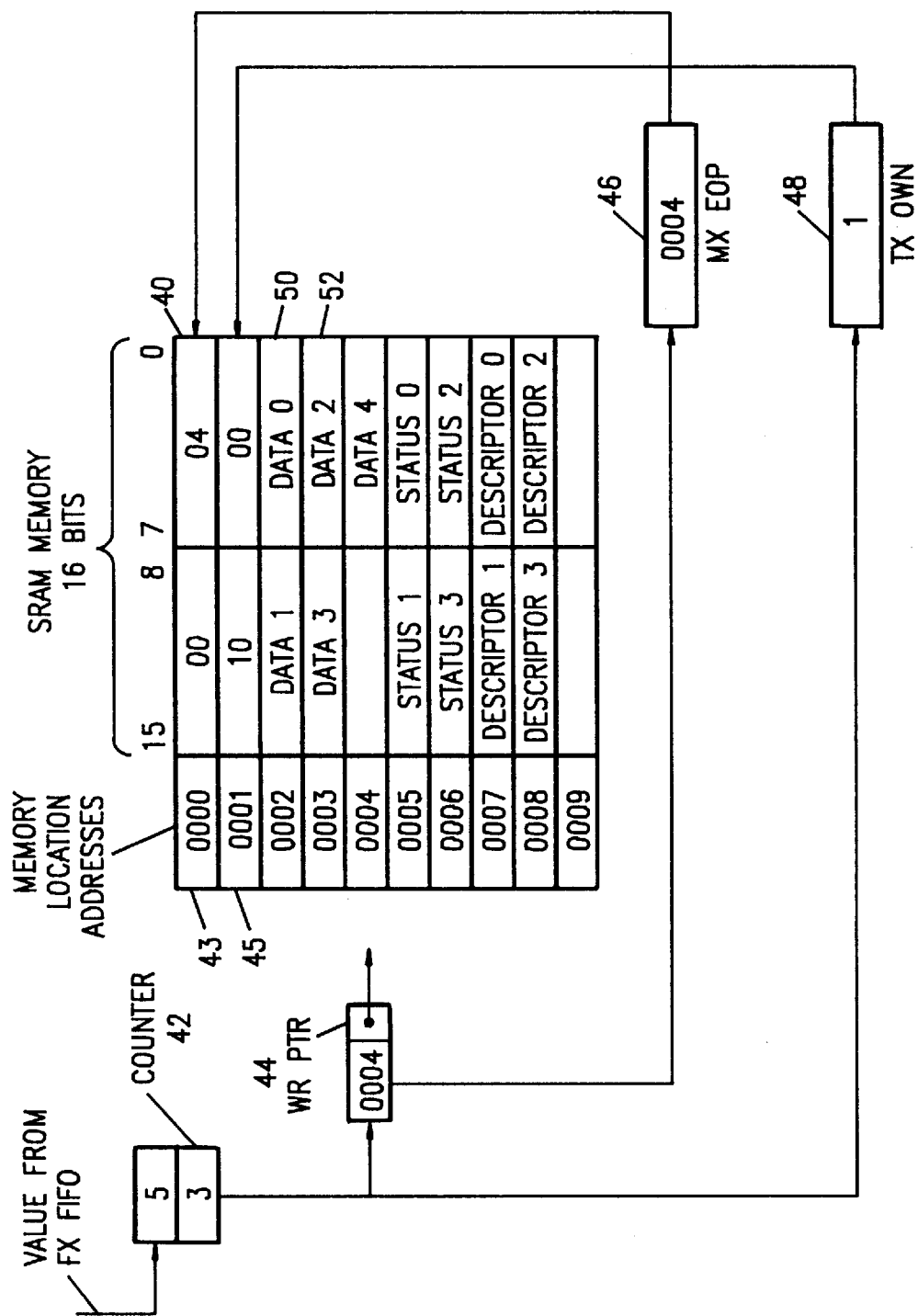
FIG. 5 is an illustration of how the end-of-packet location is stored in memory.

Referring now to FIG. 5 there is shown the situation (started in FIG. 4) when the last byte of data in the first packet has been written into memory. When the incremented value in counter 42 is equal to the value input from BX FIFO 26, the value in WR PTR 44, which in this case is HEX0004, will be written into the first reserved memory location 43. The value in WR PTR 44 will be written into register MX EOP 46 provided the value contained in register TX OWN 48 is a zero. In addition, if the value in TX OWN 48 is a zero the value will be changed to 1. The value HEX1000 in the second reserved memory location indicates that the packet is valid, that is, the end-of-packet has been written and the value in the first reserved memory location (HEX0000 in this case) is the memory location in which the end-packet-is written.

In addition to the above actions, there will be written into the next four 16 bit memory locations (after the memory location into which the last byte of data was written) the 32 bit STATUS and the 32 bit DESCRIPTOR of the packet just written into memory. As illustrated and explained in conjunction with FIG. 3, the immediate next two locations after the DESCRIPTOR will be reserved for the next packet that will be transmitted. This illustrates the value of being able to precisely identify the location of the end-of-packet that is written into memory. Being able to identify the precise location in memory of the end-of-packet allows multiple packets of varying sizes to be written into memory in the most efficient manner possible, that is, without any empty memory locations between sequential packets. It is noted that in some instances, as the above example shows, that the upper byte location of a memory location would not be written if there is an odd number of bytes in a packet.

Figure 6:
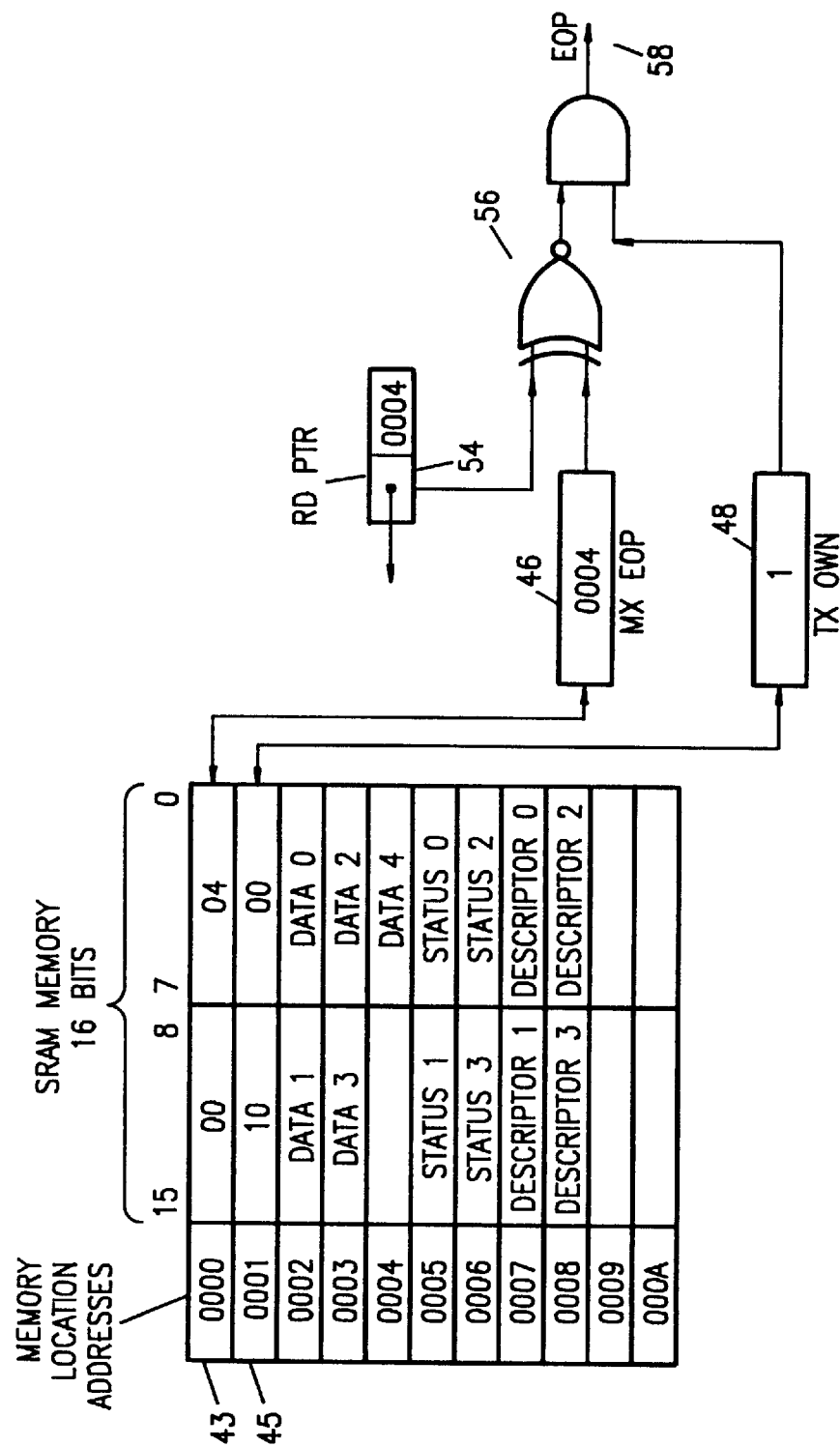
FIG. 6 is an illustration of how data is read from a portion of memory as taught in the present invention.

Referring now to FIG. 6, there is illustrated the method of reading the data in a packet when the end-of-packet has been written into memory. FIG. 6 shows the packet that was written into memory as shown in FIG. 5. The packet contains 5 bytes of data that have been written into memory location HEX0002 through the lower byte location of memory location HEX0004. Because the end-of-packet has been written into memory, the first reserved memory location (HEX0000) has been written with the memory location of the last byte in the packet, that is, the location of the end-of-packet. In this case, the memory location of the last byte is memory location HEX0004. This value, HEX0004, is also written into register MX EOP 46 when the read pointer RE PTR 54 points to the first reserved memory location, in this case, memory location HEX0000. The next step is when RD PTR 54 is pointing at the second reserved memory location, in this case, memory location HEX0001. As discussed above, the contents of the second reserved memory location will contain the value HEX1000 because the end-of-packet has been written into memory. The value contained in register MX EOP 46 is input to a comparator circuit at 56. The contents of RE PTR 54 is also input to comparator circuit 56 where it is compared to the contents of register MX EOP 46. The comparison of these two values will be either a logic TRUE or a logic FALSE and is gated by the contents of register TX OWN 48. If TX OWN 48 is TRUE (that is, a 1) and the output of the comparator circuit 56 is TRUE the end-of-packet has been reached as indicated at 58. This occurs as follows. As RD PTR 54 is incremented and points to subsequent memory locations the contents of RD PTR 54 will eventually be the same as the value entered into register MX EOP 46 when the RD PTR 54 points to the last byte in the packet, that is, the end-of-packet. When this occurs, the logic value will be TRUE and since the value of the most significant bit from the second reserved memory location is a one, defined as TRUE, the output logic will also be TRUE and it will be indicated at 58 that the end of packet has been reached.

Figure 7:
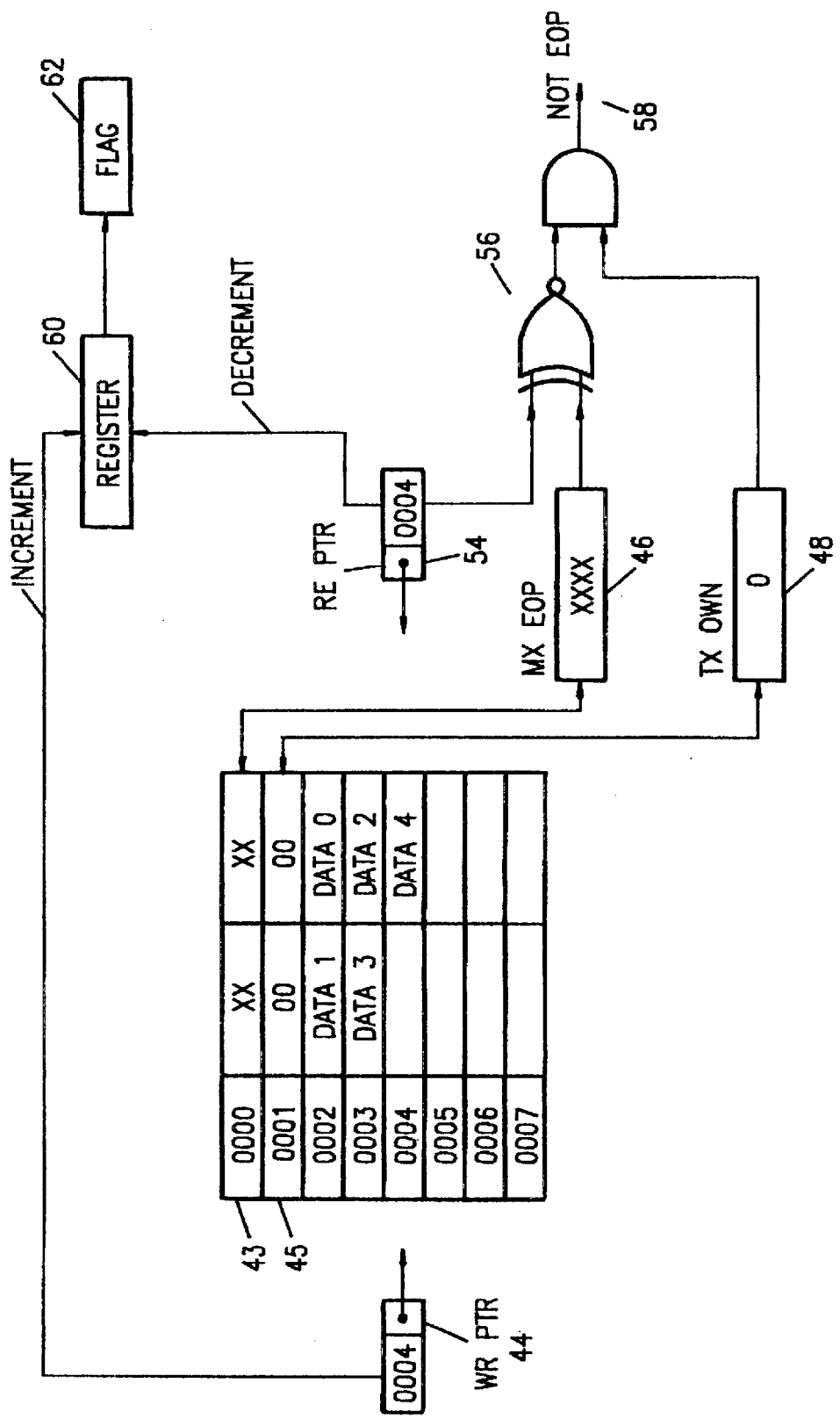
FIG. 7 is an illustration of how data is read from a portion of memory as taught in the present invention when the end-of-packet has not been written.

Referring now to FIG. 7, there is illustrated the situation in which the end-of-packet has not been written into memory and to save time the system allows the reading of the data that has been written into memory. In this case, it is important that the read pointer does not pass the write pointer and begin reading garbage. The situation as illustrated in FIG. 7 is that the end-of-packet for the packet being written into memory has not been reached, however, reading the data has begun and is allowed to begin for the sake of efficiency. For example, there are situations where the packets are much longer than the examples discussed in which case it would not be efficient for the read function to wait until a long packet is completely written before reading is begun. As described above in conjunction with FIG. 6, when the read pointer points to the first reserved memory location at 43, the contents of the first reserved memory location will be written into register MX EOP 46. At this point there is no way to determine if the value in the first reserved memory location at 43 is a valid value, that is, if it contains the location of the end-of-packet. The RE PTR 54 then points to the second reserved memory location at 45 and the most significant bit of the value contained in the second reserved memory location will be written to the register TX OWN 48. Because the most significant bit is a zero the comparator circuit at 56 will indicate a FALSE at 58 which indicates a NOT EOP. To prevent the RE PTR 54 from passing the WR PTR 44 there is provided a register 60 that is incremented each time a data value is written into memory as indicated by WR PTR 44 and is decremented each time a data value is read from memory as indicated by RD PTR 54. When the situation occurs such as that illustrated in FIG. 7 where the WR PTR 44 is pointing to memory location HEX0004 which indicates that a data value has just been written to memory location HEX0004 and the RD PTR 54 is also pointing to memory location HEX0004 which indicates that the data value in memory location HEX0004 has just been read. At this point, the value in register 60 will be zero and an EMPTY flag in register 62 will be set which will prevent any further reading of data from memory. As can be appreciated, in this situation, as additional bytes are written into memory, the value in register 60 will be incremented, at this point the value in register 60 will be 1, the flag in register 62 will be reset and the RD PTR 54 will be allowed to increment and the data in the next memory location will be allowed to be read. If there has not been any further data written into memory, the register 60 will again contain the value zero and read will again be inhibited. As the WR PTR 44 is incremented and as data is written into memory the last byte will eventually be reached at which time the counter 42 (FIGS. 4 and 5) will indicate this to WR PTR 44 and the value in the WR PTR 44 will be immediately written into MX EOP 46 and into the first reserved memory location 43. At the same time, the most significant bit in the second reserved memory location will be written to register TX OWN 48. If the value in TX OWN 48 is TRUE and when the value in RD PTR 54 matches the value in register MX EOP 46 the logic output at 58 will become TRUE indicating that the end-of-packet has been read.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications which are suited to the particular use contemplated. All such modifications and variations are within the scope of the invention as determined by the appended claims when interpreted in accordance with the breadth to which they are fairly, legally, and equitably entitled.

What we claim is:

1. A method of identifying the end-of-packet location in a memory device used as a buffer during the transmission of at least one packet, comprising the steps of:

reserving a first memory location in the memory device;

reserving a second memory location in the memory device immediately following the first reserved memory location and writing the value HEX0000 into the second memory location;

writing a sequence of data from the at least one packet into a sequential number of memory locations following the reserved first memory location;

writing into the reserved first memory location the address of the last memory location into which the sequence of data was written which includes the steps of:

inputting into a counter a number of sequential memory locations required for the sequence of data;

incrementing the counter when each memory location is written;

updating a write pointer with the memory address of the memory location into which data is being written; and writing the contents of the write pointer into the reserved first memory when the counter reaches the inputted number of sequential memory locations required.

2. The method of claim 1, wherein the step of writing a sequence of data from the at least one packet into a sequential number of memory locations is accomplished by writing the first sequence of data into a memory location immediately following the second reserved memory location.

3. The method of claim 2, further comprising the step of writing HEX1000 into the second reserved memory location when the counter reaches the inputted number of sequential memory locations required.

4. The method of claim 3, further comprising the step of reading the sequence of data.

5. The method of claim 4, further comprising the step of writing the value in the first reserved memory location into a first register.

6. The method of claim 5, further comprising the step of writing the most significant bit of the value in the second reserved memory location into a second register.

7. The method of claim 6, wherein the step of reading the sequence of data, include the steps of:

updating a read pointer with memory address of the memory location from which data is to be read; and obtaining a first logic value by comparing the memory address in the read pointer with the value contained in the first reserved memory location.

8. The method of claim 7, further comprising the step of indicating an end-of-packet when the first logic value is TRUE and value contained in the second register is TRUE.

9. The method of claim 8, further comprising the steps of:

incrementing a value in a third register when data is written into a memory location; and decrementing the third register when data is read from a memory location.

10. The method of claim 9, further comprising the step of setting an empty flag if the value in the third register has a value of zero.

11. The method of claim 10, further comprising the step of setting a full flag if the value in the third register has a value of HEXFFFF.

12. The method of claim 11, further comprising the step of preventing the step of reading a memory location if the empty flag is set.

* * * * *